Figure 1:
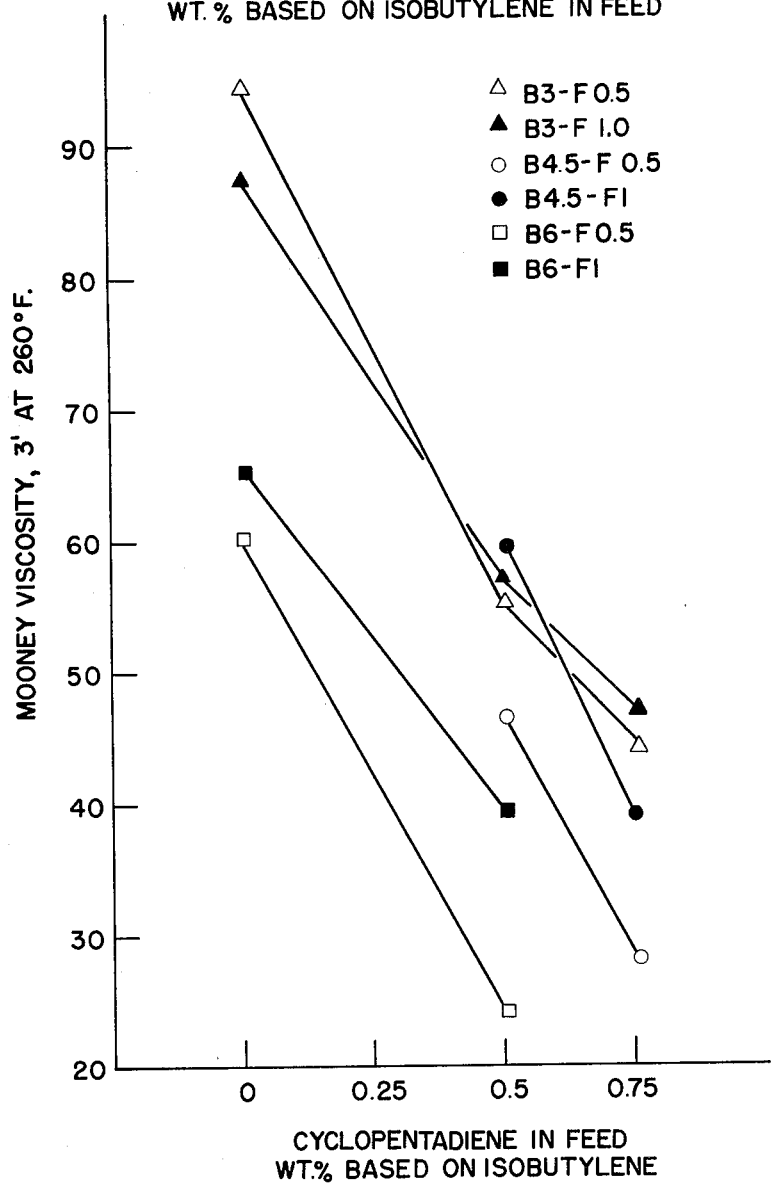

March 8, 1966  A. B. SMALL ETAL  3,239,495
TETRAPOLYMER WHICH COMPRISES ISOBUTYLENE,
ISOPRENE, CYCLOPENTADIENE AND
DIVINYLBENZENE Filed March 9, 1960  4 Sheets-Sheet 1

EFFECT OF CYCLOPENTADIENE ON PRODUCT MOONEY VISCOSITY

Augustus B. Small
Leon Sherwood Minckler, Jr  Inventors

By C. D. Stores

Patent Attorney

EFFECT OF N-BUTENES IN REACTOR LIQUID ON PRODUCT MOONEY VISCOSITY

B=ISOPRENE, E=CYCLOPENTADIENE, F=DIVNYLBENZENE
WT. % BASED ON ISOBUTYLENE IN FEED

△ B3-E 0.5-F 0.5
□ B3-E 0.5-F 1.0
○ B3-E 0.5-F 1.5

Augustus B. Small
Leon Sherwood Minckler, Jr. Inventors

By C.P. Stores

Patent Attorney

Augustus B. Small
Leon Sherwood Minckler, Jr. Inventors

By C. D. Storee

Patent Attorney

United States Patent Office 3,239,495
Patented Mar. 8, 1966

3,239,495
TETRAPOLYMER WHICH COMPRISES ISOBUTYL-
ENE, ISOPRENE, CYCLOPENTADIENE AND DI-
VINYLBENZENE
Augustus B. Small, Westfield, and Leon Sherwood
Minckler, Jr., Metuchen, N.J., assignors to Esso Research and Engineering Company, a corporation of
Delaware
Filed Mar. 9, 1960, Ser. No. 13,831
6 Claims. (Cl. 260—80.7)

This invention relates to a homogeneous tetrapolymer and more particularly to a method for improving the Mooney viscosity of a rubbery copolymer.

It is well known in the art to prepare rubbery copolymers of an isoolefin, e.g., isobutylene, with a multiolefin, e.g., isoprene, in the presence of a Friedel-Crafts catalyst by a low temperature treatment. This copolymer, butyl rubber, has been disclosed in U.S. Patent Nos. 2,356,128 and 2,399,672 and also in literature, e.g., "Synthetic Rubber," G. S. Whitby, 1954 edition. In the past, the isoolefin and multiolefin have also been copolymerized with a cyclo-alkyl-diene, e.g., cyclopentadiene, to provide a tripolymer with increased ozone resistance. However, the most serious disadvantage was due to the fact that the resulting tripolymer had a lower Mooney viscosity and molecular weight than the comparable copolymer of an isoolefin with only a multiolefin.

It has now been discovered that a homogeneous copolymer with increased Mooney viscosity and molecular weight can be obtained by copolymerizing the isoolefin, multiolefin, and cyclo-alkyl-diene with a divinyl aromatic monomer, e.g., divinyl benzene. These divinyl aromatic compounds have been incorporated in rubbery polymers in the past. However, the unobivous and surprising result in this invention is that divinyl benzene in combination with cyclopentadiene will provide a homogeneous gel-free, tetrapolymer with isobutylene and isoprene. Furthermore, the divinyl benzene has no adverse effect upon the improved ozone resistance of the polymer which is provided by the cyclopentadiene. Also, the Mooney viscosity of the tetrapolymer is increased which overcomes a serious disadvantage of the tripolymer.

One embodiment of the instant invention is to copolymerize the isoolefin and multiolefin monomers for butyl rubber with a cyclo-alkyl-diene and a divinyl aromatic monomer. The resulting tetrapolymer can be compounded with various ingredients, e.g., promoters and the like and can subsequently be cured to provide a vulcanizate therefrom.

In the present invention an isoolefin is one of the four monomers employed as feed for the reactor. This isoolefin in general is a $C_4$ to $C_7$ compound such as isobutylene or 2-methyl-1-butene.

Another monomer in the reactor feed is a multiolefin which is generally employed within the range of 0.5 to 30 wt. percent based upon isoolefin, preferably 1 to 5 wt. percent. The multiolefin is usually a $C_4$ to $C_{10}$ conjugated diolefin. This, therefore, includes isoprene, dimethyl butadiene, butadiene or piperylene.

The third reactant for polymerization is a cycloalkyldiene. Compounds within this classification include cyclopentadiene, methyl cyclopentadiene, and cyclohexadiene, all of which contain conjugated double bonds. However, the preferred monomer is cyclopentadiene having the empirical formula $C_5H_6$ and the structural formula:

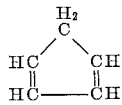

which includes the single, first member of the five carbon atom ring series and also the substituted cyclopentadienes with up to about six carbon atoms per substitute, e.g., methyl, ethyl, propyl monocyclopentadienes. The cycloalkyl-diene feed is generally between .1 and 10 wt. percent preferably between .2 and 4 wt. percent, based upon isoolefin.

A polyvinyl compound is the fourth reactor feed. Compounds within the purview of this invention are those which have the general structure as indicated herebelow:

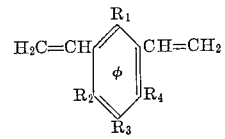

wherein $R_1$, $R_2$, $R_3$, and $R_4$ attached to the ring are each independently selected from the group consisting of hydrogen, alkyl groups containing up to 4 carbon atoms, and two or more vinyl groups; and $\phi$ is an aromatic nucleus such as benzene, naphthalene, biphenyl, and phenanthrene. Specific examples are divinyl benzenes, divinyl toluenes, divinylxylenes, divinylnaphthalenes, and trivinyl benzenes. The especially preferred compound is divinyl benzene. This polyvinyl monomer generally comprises .1 to 10 wt. percent, preferably .1 to 1 wt. percent, based upon isoolefin in the feed.

The admixture of the aforementioned four monomers, with 1 to 5 volumes of inert diluent incorporated therein, e.g., methyl chloride, is cooled to a temperature between 0 and —200° C. However, the preferred temperature range is between —60° and —130° C. This cold mixture is polymerized in the presence of a Friedel-Crafts catalyst, such as an aluminum halide catalyst in a liquid or dissolved form, in conjunction with vigorous agitation. The amount of catalyst employed is generally about 0.15 to 1.0% by weight of the mixed olefins. The polymerization reaction is rapid and the polymer precipitates out of the solution in the form of a slurry or flocculent white solid. The tetrapolymer, which is recovered and dried, has a Staudinger molecular weight between 20,000 and 100,000, preferably 30,000 to 70,000; and an iodine number between 1 and 50, preferably between 5 and 30.

This rubbery tetrapolymer can be heat treated with other compounding ingredients such as mineral fillers, e.g., hydrated silica; carbon black; and 2,2'-methylene (4-methyl 6 tertiary butyl) phenol (Antioxidant 2,246). The heat treating operation can be performed statically; dynamically, e.g., hot milling; or with intermediate combinations of alternate or cyclic static heating followed by a short interval of mastication. The heat treatment temperature is generally within the range of 250° to 450° F., preferably from 300° to 380° F. The time is inversely dependent upon the temperature, and ranges from 1 to 8 hours with static heating at 250° F., and ranges from 5 to 30 minutes with dynamic heating at 350° to 450° F. The heating time in hours may be expressed by the formula:

$$\text{Hours} = \frac{K}{T-200}$$

wherein T is the temperature in degrees Fahrenheit, and K is a constant of 50 to 600, preferably 40 to 550.

The heat treatment should be terminated with a final mastication and/or mixing to provide a mixture which is homogeneous and is in a smooth workable plastic condition.

The heat treated rubbery mixture is subsequently cooled to a temperature below 250° F. in order to incorporate curing agents without scorching occurring therein. These curing agents are generally added at a temperature between 100° and 150° F. The usual curing agents are 0.5 to 3 parts of sulfur phr.; 0.5 to 5 parts of accelerators phr., e.g., tetramethyl thiuram disulfide, 2-mercapto benzothiazole, benzothiazole disulfide, bis-4-ethylthiazole disulfide, diphenyl guanidine, butyraldehyde-aniline products, zinc dimethyl dithiocarbamate, thiazole guanadine, and aldehyde-amines. Other compounding agents which may be incorporated into the heat treated rubbery mixture after it has been cooled include non-elemental sulfur curing agents such as p-dinitroso benzene, p-quinone dioxime, and thiuram disulfide; antioxidants and stabilizers, e.g., stearic acid; zinc oxide; pigments and/or dyes; processing aids, e.g., waxes, resins and/or oils; extenders, e.g., non-volatile mineral oils and/or esters.

After the curing agents and other compounding agents have been incorporated into the heat treated rubbery polymer, the composition therefrom is extruded or molded into any desired form. The extruded admixture is subsequently cured by heating to a temperature between 250° and 270° F. for 240 to 60 minutes, or by heating to a relatively high temperature between 350° and 400° F. for 5 to 0.5 minutes, or at intermediate times and temperatures.

Thus, in accordance with this invention, it is now possible to prepare a tetrapolymer comprising an isoolefin, e.g., isobutylene; a multiolefin, e.g., isoprene; a divinyl aromatic compound, e.g., divinylbenzene (DVB); and a cycloalkyldiene, e.g., cyclopentadiene (CPD). This tetrapolymer is homogeneous and has a relatively high molecular weight. Furthermore, it has excellent resistance to ozone. It was not obvious that this tetrapolymer would be suitable because it is a more reactive polymer and more difficult to stabilize against oxidation breakdown than regular butyl or the isoprene-cyclopentadiene-isobutylene tripolymer. Therefore, it is quite surprising that the tetrapolymer is more ozone resistant than the tripolymer and it can be satisfactorily stabilized. The result was unexpected since increasing both cyclopentadiene and divinylbenzene tend to produce a gelled polymer. The combined concentration of both, however, do not result in a gelled polymer, but a homogeneous, hydrocarbon soluble polymer. Also, since both cyclopentadiene and divinylbenzene are more reactive than either isoprene or isobutylene, it is surprising that the resulting tetrapolymer is a distinct improvement over any of the possible co- or tripolymer combinations with regard to ozone resistance and utility.

The following examples are submitted to illustrate but not to limit this invention. Unless otherwise indicated, all parts and percentages in the specification are based upon weight.

EXAMPLE I

Continuous polymerization runs are carried out by using a one gallon reactor. The reaction temperature was maintained by using a mechanical refrigeration unit and the reactor was chilled by an agitated bath held at approximately −112° C. The operating conditions for the unit are as follows: feed rate, approximately 200 cc. per minute; catalyst rate, 10–40 cc. per minute; feed composition, 18% hydrocarbon and methyl chloride; catalyst concentration, 0.7–1.5 grams aluminum chloride per 100 cc. methyl chloride; reaction temperature, −95 to −102° C. The following materials were used for the polymerizations: methyl chloride, Ansul refrigeration grade; isobutylene, Bayway source, G.C. analysis, isobutylene; 99.6%, butene-1, 0.2%, trans-butene-2, 0.2%; isoprene, Phillips 99+%, redistilled; cyclopentadiene, 95+% purity monomer prepared from dicyclopentadiene, stored at Dry Ice temperature; divinylbenzene, Dow, divinylbenzene-ethyl vinyl benzene mixture, 50–60% divinyl benzene content; butene-1, Matheson, 99+% pure.

Table I herebelow indicates the results obtained by using essentially pure feeds with no n-butene added. Table II demonstrates the results obtained from using poisoned feeds.

FIGURE 1 illustrates the effect of cyclopentadiene on Mooney viscosity. Addition of 0.5 wt. percent of cyclopentadiene to the feed lowers this Mooney viscosity at least 24 to 40 units. The addition of 0.5 wt. percent of cyclopentadiene to the feed may be the maximum which can be tolerated by the system. Table III illustrates the offset of feed composition on product quality.

*Table I*

| Feed Type: | | | | | | | | | | | | | | | | |
|---|---|---|---|---|---|---|---|---|---|---|---|---|---|---|---|---|
| Isoprene (B-No.), Wt. Percent [a] | 3 | 3 | 3 | 3 | 3 | 3 | 3 | 4.5 | 4.5 | 4.5 | 4.5 | 6 | 6 | 6 | 6 | 6 |
| Cyclopentadiene (E-No.) Wt. Percent [a] | | | | 0.5 | 0.5 | 0.75 | 0.75 | 0.5 | 0.5 | 0.75 | 0.75 | | | | 0.5 | 0.5 |
| Divinyl Benzene (F-No.) Wt. Percent [a] | | 0.5 | 1.0 | 0.5 | 1.0 | 0.5 | 1.0 | 0.5 | 1.0 | 0.5 | 1.0 | | 0.5 | 1.0 | 0.5 | 1.0 |
| Conversion, Wt. Percent | 46 | 58 | 57 | 49 | 43 | 61 | 68 | 59 | 64 | 52 | 62 | 51 | 48 | 54 | 52 | 51 |
| Equil. conc. of n-butenes, Wt. Percent [b] | 0.7 | 1.0 | 0.9 | 0.8 | 0.7 | 1.0 | 1.3 | 1.0 | 1.1 | 0.8 | 1.1 | 0.8 | 0.8 | 0.9 | 0.8 | 0.8 |
| Cyclopentadiene in Polymer, Wt. Percent [c] | | | | 1.02 | 1.16 | 1.23 | 1.10 | 0.85 | 0.78 | 1.44 | 1.21 | | | | 0.96 | 0.98 |
| Catalyst Efficiency [d] | 1,080 | 1,200 | 730 | 490 | 430 | 820 | 660 | 630 | 760 | 390 | 480 | 620 | 740 | 840 | 330 | 650 |
| Product Evaluation: | | | | | | | | | | | | | | | | |
| Visc. Avg. Mol. Wt.×10⁻³ | 800 | 800 | 820 | 430 | 380 | 360 | 360 | 370 | 450 | 280 | 320 | 420 | 740 | 710 | 250 | 370 |
| Gel, Wt. Percent | 0 | 0 | 0–23.4 | 0 | 0 | 0 | 0 | 0 | 0 | 0 | 0 | 0 | 0 | 0 | 0 | 0 |
| Mooney Visc., 3' at 260° F. [e] | 80 | 94 | 86 | 55 | 57 | 44 | 47 | 46 | 59 | 28 | 39 | 44 | 60 | 64 | 24 | 39 |
| Iodine No. | 8.3 | 10.7 | 10.5 | 13.0 | 15.6 | | | | | | | 21.4 | 22.2 | 21.9 | 24.1 | 25.8 |
| Reactor Fouling* | 1 | 2 | (f) | 1 | 1 | 1 | 1 | 1 | 1 | 1 | 1 | 1 | 2 | 1 | 1 | 2 |

*1=Only minor fouling, mainly around the catalyst nozzle. 2=Considerable fouling, but no difficulties in operation. 3=Heavy fouling. Plugging.
[a] Wt. percent based on isobutylene in feed.
[b] Wt. percent based on unreacted isobutylene.
[c] Based on 100% utilization of cyclopentadiene.
[d] Lbs. polymer per lb. AlCl₃ used.
[e] One minute preheat, 3 minute reading.
[f] React. quenched.

Table II

| Feed Type: | | | | | | | | |
|---|---|---|---|---|---|---|---|---|
| Isoprene (B-No.), Wt. percent [a] | 3 | 3 | 3 | 3 | 3 | 3 | 3 | 3 |
| Cyclopentadiene (E-No.), Wt. percent [a] | 0.25 | 0.35 | 0.5 | 0.5 | 0.5 | 0.5 | 0.5 | 0.5 |
| Divinyl Benzene (F-No.), Wt. percent [a] | 0.5 | 0.5 | 0.5 | 0.5 | 1.0 | 1.0 | 1.0 | 1.5 |
| n-Butene, Wt. percent [a] | 2.4 | 2.4 | 0.4 | 2.4 | 0.4 | 2.4 | 4.4 | 4.4 |
| Conversion, Wt. percent [a] | 46 | 53 | 49 | 59 | 43 | 53 | 50 | 58 |
| Equil. Conc. n-butenes, Wt. percent [b] | 4.4 | 5.1 | 0.8 | 5.9 | 0.7 | 5.1 | 8.8 | 10.5 |
| Cyclopentadiene in Polymer, Wt. percent [c] | 0.54 | 0.66 | 1.02 | 0.84 | 1.16 | 0.94 | 1.0 | 0.86 |
| Catalyst Efficiency [d] | 510 | 540 | 490 | 570 | 430 | 520 | 470 | 480 |
| Product Evaluation: | | | | | | | | |
| Visc. Avg. Mol. Wt.×10⁻³ | 450 | 390 | 430 | 270 | 380 | 410 | 340 | 310 |
| Gel, Wt. percent | 0 | 0 | 0 | 0 | 0 | 0-4.2 | 0 | 0 |
| Mooney Visc., 3 minutes at 260° F. [e] | 60 | 50 | 55 | 32 | 57 | 55 | 38 | 38 |
| Iodine No., cgms. I₂/gm. polymer | 12.2 | 12.6 | 13.0 | 13.5 | 15.6 | 14.6 | --- | --- |
| Reactor Fouling* | 1 | 2 | 1 | 1 | 1 | 1 | 1 | 2 |

*1 = Only minor fouling, mainly around the catalyst nozzle.
2 = Considerable fouling, but no difficulties in operation.
3 = Heavy fouling. Plugging.
[a] Wt. percent based on isobutylene in feed.
[b] Wt. percent based on unreacted isobutylene.
[c] Based on 100% utilization of cyclopentadiene.
[d] Lbs. polymer per lbs. AlCl₃ used.
[e] One minute preheat, 3 minute reading.

Table III

| | | | | |
|---|---|---|---|---|
| B-3 feed | 3 | 3 | 3 | 3 |
| Cyclopentadiene | 0 | .5 | 0 | .5 |
| Divinyl Benzene | 0 | 1.0 | 1.0 | 0 |
| Mooney Viscosity, 3 Min. at 260° F | 80 | 57 | 86 | 35 |
| Gel, percent | 0 | 0 | 23 | 0 |

Figure 2:
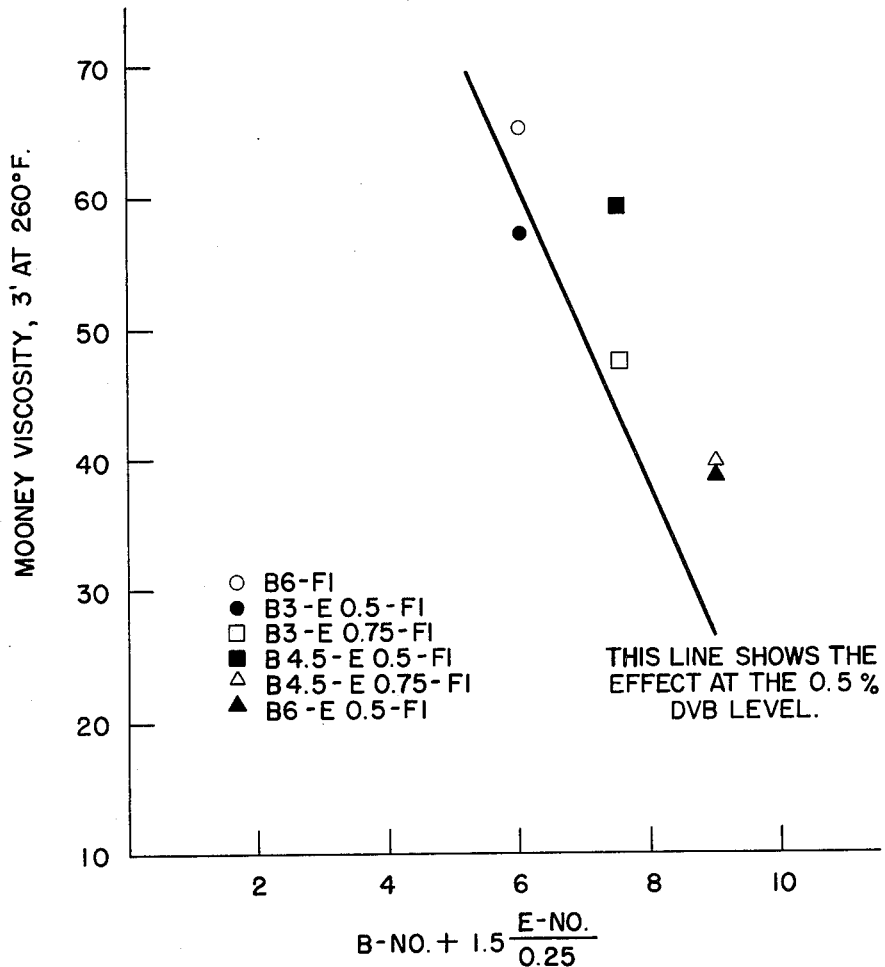
Figure 3:
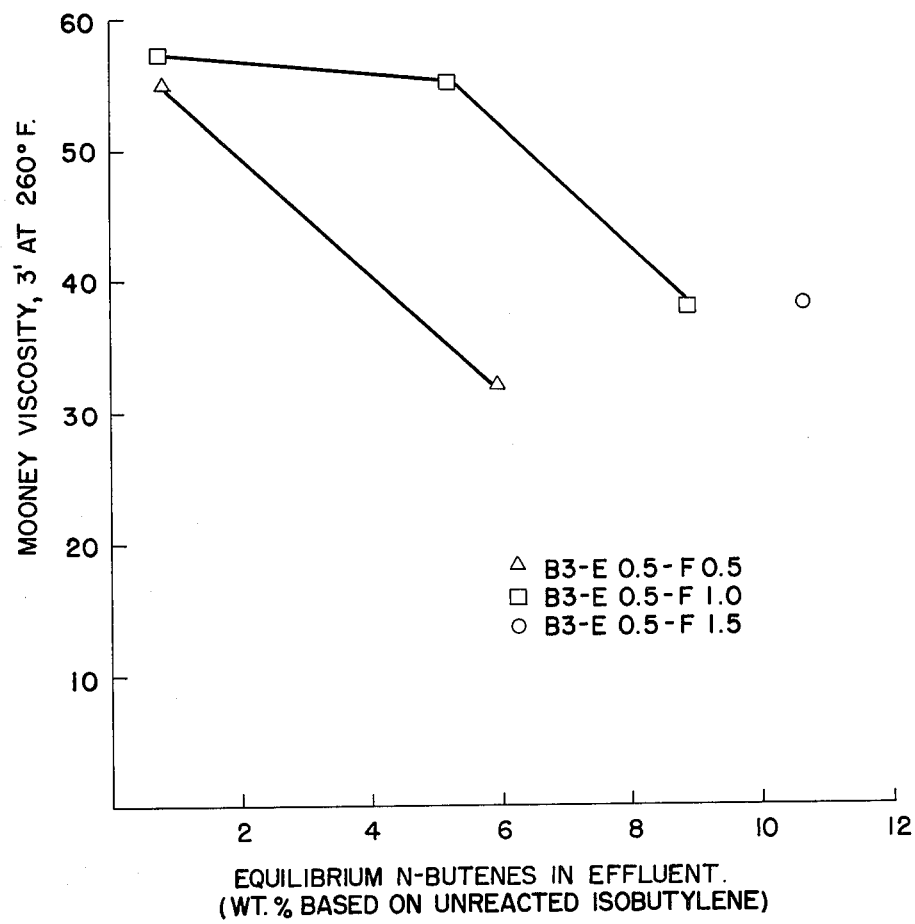
Figure 4:
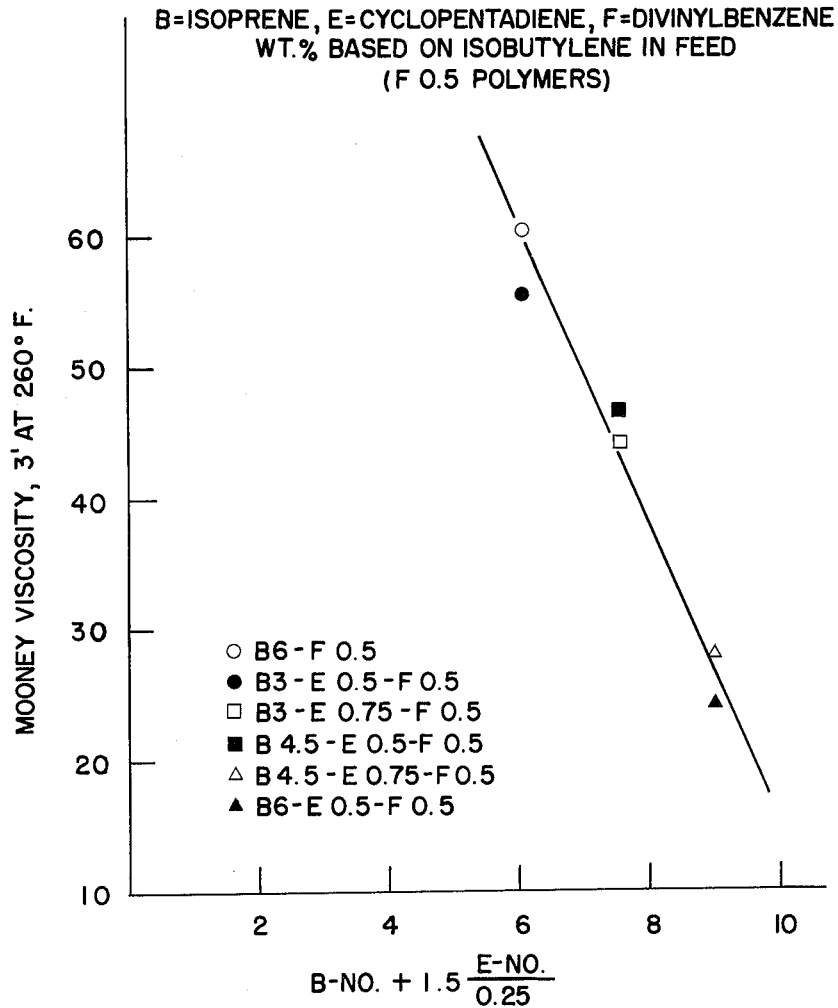

From Table III it can be concluded that a gel-free tetra polymer of a satisfactory high Mooney viscosity, with excellent ozone resistance can be prepared. The cyclopentadiene tripolymer alone is too low in Mooney viscosity and the divinyl benzene product contains gel. FIGURES 2 and 4 demonstrate the relative poisoning effect of cyclopentadiene and isoprene. It appears that the poisoning effect of the cyclopentadiene is approximately 6 times as strong as isoprene. FIGURE 3 exemplifies the fact that increasing the divinyl benzene content in the feed increases the Mooney viscosity of the product and that the divinyl benzene has a more pronounced effect in which there is a high isoprene content in the feed. The addition of n-butenes cause a decrease in Mooney viscosity and in FIGURE 3 the equilibrium concentration of n-butenes is plotted against the Mooney viscosity. It should be noted that divinyl benzene is effective in overcoming the poisoning effects of increasing amounts of n-butenes in the reactor liquid. In the above example it is shown that the best overall properties are obtained in the tetrapolymer system.

EXAMPLE II

One hundred parts of isobutylene were polymerized in a reactor with various parts of isoprene, cyclopentadiene, and divinyl benzene as indicated in Table IV at a temperature of −100° C. in the presence of methyl chloride as a solvent and 0.2 parts of AlCl₃ as a catalyst. The polymers therefrom were cured at a temperature of 307° F. for 40 minutes and the physical properties were recorded as also shown in Table IV.

Table IV

| | | | | |
|---|---|---|---|---|
| Isoprene | 2.5 | 2.5 | 2.5 | 4 |
| Cyclopentadiene | | 0.5 | 0.5 | 2 |
| Divinyl Benzene | | | 0.5 | 2 |
| Mooney Vis. 8 Min. at 212° F | 77 | 51 | 72 | 38 |
| 300% Mod., p.s.i. | 900 | 950 | 1,340 | 1,820 |
| Tensile, p.s.i. | 3,210 | 3,030 | 2,760 | 1,970 |
| Elongation, percent | 680 | 640 | 510 | 330 |
| Ozone Resistance, Hrs. to Break | 0.75 | 6.5 | 10 | 30+ |

This example illustrates that the cure rate of the tetrapolymer is increased and that the tetrapolymer is highly ozone resistant.

EXAMPLE III

Table V herebelow demonstrates the advantages of the instant invention. It is manifest that utilizing the components in Run 3 that superior ozone resistance is obtained but the physical strength is still maintained.

Table V

| | 1 | 2 | 3 |
|---|---|---|---|
| B | 3 | 3 | 3 |
| E | 0 | 0 | .5 |
| F | 0 | .5 | .5 |
| M 212 | >130 | >130 | 76 |
| 300% Mod | 760 | 1,090 | 970 |
| Ten. Strength | 1,500 | 1,550 | 1,150 |
| Percent Elong | 540 | 450 | 320 |
| Ozone, min. to crack/brake | 56/95 | 75/92 | 135/230 |

Having set forth the general nature and specific embodiments of the present invention, the true scope is now particularly pointed out in the appended claims.

What is claimed is:

1. A homogeneous tetrapolymer with a relatively high molecular weight which comprises in combination, per 100 parts of isobutylene, .5 to 5 parts of isoprene, .1 to 1 part of cyclopentadiene, and .1 to 1 part of divinylbenzene; said tetrapolymer being capable of being compounded and cured to provide a vulcanizate therefrom with improved ozone resistance.

2. A composition of matter which comprises a homogeneous tetrapolymer with a relatively high molecular weight comprising in combination per 100 parts of isobutylene, .5 to 5 parts of isoprene, .1 to 1 part of cyclopentadiene, and .1 to 1 part of divinyl benzene, said tetrapolymer having been compounded and cured at elevated temperatures to provide a vulcanizate with improved ozone resistance.

3. A process which comprises polymerizing, at a temperature between 0° and −200° C. and in the presence of a Friedel-Crafts catalyst, per 100 parts of isobutylene .5 to 5 parts of isoprene, .1 to 1 part of cyclopentadiene, and .1 to 1 part of divinylbenzene to provide a homogeneous tetrapolymer with a relatively high molecular weight.

4. A process which comprises compounding a relatively high molecular weight homogeneous tetrapolymer comprising, in combination, per 100 parts of isobutylene, 0.5 to 5 parts of isoprene, 0.1 to 1 part of cyclopentadiene and 0.1 to 1 part of divinyl benzene with a curing agent; and curing the compounded tetrapolymer at a temperature above 250° F. to provide a vulcanizate therefrom with improved ozone resistance.

5. A homogeneous tetrapolymer with a relatively high molecular weight, which comprises in combination, per 100 parts of isobutylene, 2.5 parts of isoprene, 0.5 part of cyclopentadiene and 0.5 part of divinylbenzene, said tetrapolymer being capable of being compounded and cured to provide a vulcanizate therefrom with improved ozone resistance.

6. A homogeneous tetrapolymer with a relatively high molecular weight, which comprises in combination, per 100 parts of isobutylene, 4 parts of isoprene, 2 parts of cyclopentadiene and 2 parts of divinylbenzene, said tetrapolymer being capable of being compounded and cured to provide a vulcanizate therefrom with improved ozone resistance.

References Cited by the Examiner

UNITED STATES PATENTS

| | | | |
|---|---|---|---|
| 2,626,940 | 1/1953 | Sparks et al. | 260—79.5 |
| 2,729,626 | 1/1956 | Welch et al. | 260—79.5 |
| 2,732,354 | 1/1956 | Morrissey et al. | 260—79.5 |
| 2,739,141 | 3/1956 | Ernst et al. | 260—79.5 |
| 2,781,334 | 2/1957 | Welch et al. | 260—79.5 |
| 3,080,337 | 3/1963 | Minckler et al. | 260—80.7 |

LEON J. BERCOVITZ, *Primary Examiner.*

MILTON STERMAN, *Examiner.*